Patented July 24, 1951

2,561,673

UNITED STATES PATENT OFFICE 2,561,673

CONVERSION OF DISULFIDES TO THIA-SUCCINIC ACIDS

Wayne A. Proell, Chicago, Ill., and Chester E. Adams, Highland, Ind., assignors to Standard Oil Company, Chicago, Ill., a corporation of Indiana No Drawing. Application December 3, 1949, Serial No. 131,064

14 Claims. (Cl. 260—537)

1

This invention relates to a novel process for the conversion of certain hydrocarbon disulfides to thia-hydrocarbon succinic acids. More particularly, it relates to a process for the interaction of non-tertiary hydrocarbon disulfides containing no aliphatic unsaturation with maleic acid or an equivalent in an aqueous alcoholic solution of a strong alkali.

It is an object of this invention to provide a novel and economical process for the production of thia-hydrocarbon succinic acids. Another object of this invention is to provide a novel process for the conversion of saturated or aromatic non-tertiary hydrocarbon disulfides to thia-hydrocarbon succinic acids. An additional object of this invention is to provide a method whereby maleic acid or an equivalent such as maleic anhydride or fumaric acid may be converted to a thia-hydrocarbon succinic acid. These and other objects of our invention will become apparent from the ensuing description thereof.

We have made the unexpected discovery that saturated and aryl non-tertiary hydrocarbon disulfides undergo reaction with the maleate ion in the presence of a strong alkali in a suitable solvent medium. A suitable solvent medium is a concentrated aqueous solution of a low molecular weight, water-soluble coupling solvent, e. g. a low molecular weight alcohol such as methanol, ethanol or isopropanol, or a water-soluble ether such as dioxane, which function as mutual solvents both for a maleate such as potassium maleate and the hydrocarbon disulfide reactant. The reaction is readily accomplished usually simply by stirring and refluxing the reactants at atmospheric or slightly elevated pressures.

The disulfides employed in the practice of the present invention may be symmetrical or unsymmetrical with respect to the hydrocarbon group or groups therein contained. The hydrocarbon groups in the disulfides are saturated or aromatic (i. e., they contain no aliphatic unsaturation) and non-tertiary (i. e., the carbon atoms bound to the sulfur atoms are directly bound to no more than two other carbon atoms). Suitable hydrocarbon groups are non-tertiary alkyl groups. Examples of suitable alkyl groups which may be contained in the disulfide molecule are methyl, ethyl, n-propyl, isopropyl, n-butyl, isobutyl, n-octyl, 2-ethylhexyl, n-lauryl, n-octadecyl and the like. The saturated non-tertiary hydrocarbon radical contained in the disulfide reactant may be a cycloalkyl radical. Examples of suitable non-tertiary cycloalkyl radicals include cyclobutyl, cyclopentyl, cyclohexyl, sec-methylcyclopentyl, sec-methylcyclohexyl, sec-[2,2,1]bicycloheptyl and the like. The saturated non-tertiary hydrocarbon group may be substituted by an aromatic radical, for example as in benzyl or naphthomethyl disulfides. Examples of suitable saturated non-tertiary hydrocarbon disulfides include methyl disulfide, ethyl disulfide, methyl ethyl disulfide, methyl propyl disulfide, diisopropyl disulfide, di-n-butyl disulfide, isoamyl disulfide, n-amyl disulfide and the like. Examples of suitable aryl disulfides which may be employed in the practice of the present invention are disulfides in which one or both sulfur atoms are bound to phenyl, diphenyl, naphthyl, tolyl, xylyl, chlorophenyl groups or the like. Mixed disulfides may be employed, e. g. methyl phenyl disulfide, isopropyl tolyl disulfide, and the like.

The olefinic reactant of the present invention is the maleate or fumarate ion although the latter reacts at a considerably lower rate than the former. Both maleate and fumarate ions undergo reaction with the hydrocarbon disulfides in question to produce a 2(1-thia-hydrocarbon) succinate.

The present reaction is catalyzed by the presence of a strong alkali. We prefer to employ KOH or NaOH, although the more expensive LiOH can also be employed. When maleic anhydride or maleic acid is employed as the charging stock in the present reaction, reaction occurs between the acid or anhydride and 2 mols of alkali to produce the neutral maleate. It is desirable that about 1 mol of free alkali be present in the reaction zone per mol of maleate or fumarate ion although as much as about 3 mols of free alkali or as little as 0.2 mol may be employed per mol of neutral maleic or fumaric salt. The use of excessive amounts of alkali creates an expense and nuisance when it is desired to convert the thia-alkyl succinate salt to the free acid, but does not otherwise appear to be substantially deleterious in the reaction.

The solvent medium employed is, as stated above, a concentrated solution of a low molecular weight, water-soluble coupling solvent, e. g., a low molecular weight, water-soluble alcohol such as methanol, ethanol or isopropanol in water, or a water-soluble ether such as dioxane. The water concentration in the solution may vary between about 1 and about 50 volume percent.

In the usual practice of the inventive process the fumarate or maleate (or maleic acid or anhydride), alkali and solvent are mixed and stirred at the reflux or other reaction temperature for a period of time sufficient to obtain substantial conversion. It will be apparent, however, that different orders of mixing may be employed as the occasion demands. For example, the alkali and solvent may first be mixed, the maleate then added, the mixture brought to reflux temperature and the hydrocarbon disulfide added gradually over the course of the reaction period.

The reaction can be effected at temperatures between about 50 and about 150° C., preferably between about 70 and about 100° C., under a pressure sufficient at least to maintain the liquid phase, usually pressures between about 0 and about 100 p. s. i. g. It will be apparent that the use of superatmospheric pressures will permit higher temperatures in the reaction zone while maintaining the liquid phase therein and will thus tend, as a rule, to increase the rate of reaction. The time of reaction will be dependent upon the other reaction variables and the extent of conversion sought to be effected in a particular case, but will generally vary over the range of about ¼ to about 20 hours.

We have made the further unexpected discovery that sodium sulfide, which we have employed in the form of its nonahydrate, functions as a co-catalyst with the strong alkali present in the reaction zone and greatly facilitates the reaction, as will be demonstrated by the examples recounted hereinafter. The sodium sulfide (calculated as nonahydrate) may be employed in proportions between about 10 and about 300 percent by weight, based on the maleate or fumarate, preferably about 75 percent.

The following examples are provided for the purpose of illustrating but not unnecessarily limiting the present invention.

EXAMPLE 1

One mol of potassium maleate and 1 mol of methyl disulfide were mixed with 35 g. of potassium hydroxide and 400 cc. of 95 percent ethanol. The mixture was stirred under reflux at 76° C. for 4 hours, during which time it changed from a paste to a thin suspension. The product was diluted, and the aqueous phase acidified with HCl and dried. The dried salt analyzed 7.92% sulfur, indicating a substantial degree of reaction of the disulfide with the maleic acid.

EXAMPLE 2

Isoamyl and n-butyl disulfides, respectively, reacted similarly with maleic acid potassium salt to give an acid sparingly soluble in water, soluble in ether, and soluble in dilute bases.

We have completed a more detailed examination of the application of the inventive process to the reaction of n-amyl disulfide with potassium maleate in ethanolic KOH, with and without the co-employment of $Na_2S.9H_2O$ as a co-catalyst. The resulting Examples are tabulated below. The reactions were effected at atmospheric pressure by stirring the reactants at the reflux temperature, viz. 80 to 83° C. The product in each case was 2(1-thiahexyl) succinic acid potassium salt.

Table

| Ex. | Mols Maleic Acid | Mols Disulfide | Ethanol, ml. | KOH, g. | $H_2O$, ml. | $Na_2S.9H_2O$, g. | Time, hrs. | Conversion,[1] Per Cent |
|---|---|---|---|---|---|---|---|---|
| 3 | 1.13 | 2.23 | 500 | 260 | 0 | 0 | 15 | 18 |
| 4 | 1.03 | 2.38 | 600 | 260 | 100 | 0 | 15 | 36 |
| 5 | 1.05 | 1.48 | 600 | 350 | 200 | 0 | 17 | 25 |
| 6 | 1.04 | 1.50 | 500 | 260 | 50 | 0 | 16 | ca. 15–20 |
| 7 | 1.05 | 1.43 | 600 | 190 | 100 | 240 | 15 | 31 |
| 8 | 1.08 | 1.48 | 600 | 225 | 0 | 148 | 6 | 50 |
| 9 | 1.04 | 1.48 | 600 | 240 | 15 | 75 | 15 | 59 |

[1] Based on maleic acid charged.

EXAMPLE 10

Phenyl disulfide (60 g.) and maleic anhydride (34 g.) were placed in a 3-neck flask provided with a mechanical stirrer and a thermometer. Ethanol in the amount of 200 cc. was added to the reactor, the mixture was stirred and thereafter 89 g. KOH, 20 g. $Na_2S.9H_2O$ and 5 cc. of water were added to the stirred mixture. Reaction was effected by stirring the reaction mixture under reflux at 83° C. for 5.5 hours. The crude product was acidified, extracted with ethyl ether and the ether extract was washed with aqueous ammonia to produce an ammonia extract. The ammonia extract was acidified and the crude acid product was isolated by ethyl ether extraction, resulting in the recovery of 71 g. of organic acid product free of neutral oils. The product, 2-(1-thiabenzyl) succinic acid, was a sticky crystalline mass, completely soluble in ethyl ether, sparingly soluble in water and completely soluble in alkaline water. The product contained 7.8 weight percent sulfur, indicating the yield of pure thiaphenyl succinic acid to be 33 percent.

It should be emphasized that unreacted materials are recovered unchanged from the reaction mixtures and, therefore, even though the conversion in one operation may be low, by the employment of a number of stages the ultimate yield of almost 100 percent can be achieved in many instances.

The thia-hydrocarbon succinic acid products of the present invention can be purified by solution in aqueous dilute hydrochloric acid, extraction with diethyl ether and recrystallization of the soluble acids from hot benzene. Maleic and fumaric acids are practically insoluble in benzene and the thia-hydrocarbon succinic acids can, thus, be separated from unconverted maleic acid.

The thia-hydrocarbon succinic acids produced by the present process are adaptable to a considerable number of chemical conversions and uses. Thus, the thia-alkyl succinic acids or hydrocarbon oil-soluble soaps thereof in which the alkyl group contains between about 8 and about 24 carbon atoms, for example 12 carbon atoms, may be employed in hydrocarbon oils such as lubricating oils, furnace oils, Diesel oils, etc. in proportions between about 0.01 and about 5 percent as oiliness and antirust agents.

The thia-alkyl succinic acids, for example 2-(1-thiatridecyl) succinic acid and its sodium, potassium, ammonium or amine salts may be employed as detergents, wetting agents and emulsifying agents, the desired variations in properties being obtainable by variations in the molecular weight of the alkyl group and in the neutralizing agent.

The thia-hydrocarbon succinic acids can be subjected to a variety of chemical conversions to produce products of value and interest. Thus, oxidation may be effected at the sulfur atom in these compounds by means of oxidizing agents such as hydrogen peroxide to produce sulfoxo and sulfono derivatives. For example, 2-(1-thiapropyl) succinic acid may be esterified by conventional methods to produce the dioctyl or dinonyl ester thereof and oxidized at the sulfur atom to produce an ethylsulfonosuccinic ester which may be employed as a plasticizer in various synthetic resins and rubbers, for example in proportions between about 5 and about 50 percent by weight in vinyl chloride-vinyl acetate copolymers (the Vinylites).

The thia-hydrocarbon succinic acids may also be treated with ethylene oxide, propylene oxide or the like to produce polyalkylene oxide derivatives which may thereafter be sulfated to produce wetting agents and detergents.

The thia-hydrocarbon succinic acids can be converted to a variety of salts or soaps. Of these, the heavy metal soaps such as calcium, aluminum, barium or lead soaps may be employed in the formulation of greases and slushing compounds.

The thia-hydrocarbon succinic acids can be converted to internal anhydrides by conventional distillation, and to higher molecular weight polyanhydrides by molecular distillation. The acids produced by this invention may also be converted by conventional methods to acid chlorides, amides and esters. From the the amides the corresponding substituted succinic nitrile can be produced by dehydration, for example with P2O5 or by vapor phase treatment with catalysts such as alumina or the like.

The thia-hydrocarbon succinic acids can be reacted with alkylene diamines such as hexamethylene diamine or with polyhydric alcohols, for example ethylene glycol, glycerol, trimethylolpropane, pentaerythritol or the like to produce synthetic resins for use in coating materials.

The internal anhydrides obtained from thiahydrocarbon succinic acids can be employed in Haworth type succinoylation and cyclization reactions. The thia-alkyl succinic acids may be condensed with dialkylaminophenols to produce substituted rhodamine type dyes, this treatment permitting the control of color and solubility of the dyes. The thia-alkyl succinic acids may also be employed in other dye synthesizing operations.

The thia-alkyl succinic acids may also be employed as pickling inhibitors for pickling acids such as sulfuric and hydrochloric acids.

Having thus described our invention, what we claim is:

1. A process for the production of a thia-succinic compound having the formula

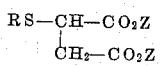

wherein R is a non-tertiary hydrocarbon radical containing no aliphatic unsaturation of Z is selected from the class consisting of H, K, Li and Na, which process comprises contacting an aqueous solution containing the maleate ion, a free alkali selected from the class consisting of KOH, LiOH and NaOH and a low molecular weight water-soluble coupling solvent, with a non-tertiary hydrocarbon disulfide containing no aliphatic unsaturation at a temperature between about 50 and about 150° C. under pressure sufficient to maintain the liquid phase and recovering a thia-succinic compound thus produced.

2. The process of claim 1 wherein R is a saturated non-tertiary hydrocarbon radical.

3. The process of claim 1 wherein a catalytic quantity of sodium sulfide is present in the reaction zone.

4. The process of claim 1 wherein said solvent is ethanol.

5. The process of claim 1 wherein said alkali is KOH.

6. A process for the production of a thia-succinic acid having the formula

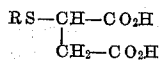

wherein R is a saturated non-tertiary hydrocarbon radical, which process comprises contacting an aqueous solution containing the maleate ion, a free alkali selected from the class consisting of KOH, LiOH and NaOH and a low molecular weight water-soluble alcoholic coupling solvent, with a non-tertiary alkyl disulfide at a temperature between about 50 and about 150° C. under pressure sufficient to maintain the liquid phase and recovering a thia-succinic acid thus produced.

7. The process of claim 6 wherein the alkyl disulfide is methyl disulfide.

8. The process of claim 6 wherein the alkyl disulfide is n-butyl disulfide.

9. The process of claim 6 wherein the alkyl disulfide is n-amyl disulfide.

10. The process of claim 6 wherein the alkyl disulfide is isoamyl disulfide.

11. The process of claim 6 wherein a catalytic quantity of sodium sulfide is present in the reaction zone.

12. A process for the production of a thia-succinic acid having the formula

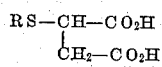

wherein R is a saturated non-tertiary hydrocarbon radical, which process comprises contacting an aqueous solution containing the maleate ion, a free alkali selected from the class consisting of KOH, LiOH and NaOH in the amount of at least about 1 mol per mol of said maleate, and a low molecular weight water-soluble alcoholic coupling solvent, with a non-tertiary alkyl disulfide at a temperature between about 50 and about 150° C. under pressure sufficient to maintain the liquid phase and recovering a thia-succinic acid thus produced.

13. The process of claim 1 wherein R is an aryl radical and said hydrocarbon disulfide is an aryl disulfide.

14. The process of claim 1 wherein R is a phenyl radical and said hydrocarbon disulfide is phenyl disulfide.

WAYNE A. PROELL.
CHESTER E. ADAMS.

REFERENCES CITED

The following references are of record in the file of this patent:

FOREIGN PATENTS

| Number | Country | Date |
|---|---|---|
| 845,793 | France | Sept. 1, 1939 |

OTHER REFERENCES

Whitmore, Org. Chem. (Van Nostrand), pp. 157, 162 (1937).

Schoberl et al., Chem. Abstracts, vol. 33; cols. 964–965 (1939).

Certificate of Correction

Patent No. 2,561,673                                                July 24, 1951

WAYNE A. PROELL ET AL.

It is hereby certified that error appears in the printed specification of the above numbered patent requiring correction as follows:

Column 5, line 8, for "dinonly" read *dinonyl*; line 64, after "unsaturation" strike out "of" and insert instead *and*;

and that the said Letters Patent should be read as corrected above, so that the same may conform to the record of the case in the Patent Office.

Signed and sealed this 18th day of September, A. D. 1951.

[SEAL]

THOMAS F. MURPHY,
*Assistant Commissioner of Patents.*